United States Patent [19]
Johnson

[11] Patent Number: 5,533,584
[45] Date of Patent: Jul. 9, 1996

[54] VEHICLE WITH FRONT AND REAR STEERING

[75] Inventor: Thomas R. Johnson, Lakeside, United Kingdom

[73] Assignee: Caterpillar Inc., Peoria, Ill.

[21] Appl. No.: 256,614

[22] PCT Filed: Jan. 18, 1993

[86] PCT No.: PCT/GB93/00101
§ 371 Date: Jul. 14, 1994
§ 102(e) Date: Jul. 14, 1994

[87] PCT Pub. No.: WO93/13972
PCT Pub. Date: Jul. 22, 1993

[30] Foreign Application Priority Data

Jan. 17, 1992 [GB] United Kingdom .............. 9200966

[51] Int. Cl.⁶ .................................... B62D 5/06
[52] U.S. Cl. ................. 180/415; 180/410; 180/405
[58] Field of Search ....................... 180/142, 140, 180/132, 79.1, 234, 236; 280/91

[56] References Cited

U.S. PATENT DOCUMENTS 3,813,936 10/1975 Thomas .......................... 280/91
4,982,799 1/1991 Fujimoto et al. ................ 172/2
4,995,472 2/1991 Hayashi et al. ................ 180/234
5,076,382 12/1991 Vaughn et al. ................. 180/140

FOREIGN PATENT DOCUMENTS 0300774 1/1989 European Pat. Off. .
1194744 6/1970 United Kingdom .
2208282 3/1989 United Kingdom .
0404422 12/1990 United Kingdom .
2263451 7/1993 United Kingdom .

Primary Examiner—Anne Marie Boehler
Attorney, Agent, or Firm—Claude F. White

[57] ABSTRACT

A vehicle has a steering control system including a first mode in which the front and rear steering mechanisms operate and a second mode in which only the front steering mechanism operates. When the control system is switched from the first mode to the second mode by a master switch, the change to the second mode is prevented unless and until the rear steering mechanism is in a straight-ahead condition. This condition is sensed by an alignment sensor which is activated by the switching of the master switch to the state corresponding to the second mode.

7 Claims, 2 Drawing Sheets

VEHICLE WITH FRONT AND REAR STEERING

This invention relates to a vehicle comprising front and rear steering mechanisms and a steering control system having a first mode in which both steering mechanisms operate and a second mode in which only one of the steering mechanisms operates. The invention is applicable primarily, but not exclusively, to wheeled vehicles, e.g. telescopic material handlers, fork lifters, off-road vehicles, etc.

A vehicle is known having steerable front wheels and optionally steerable rear wheels. The driver turns the steering wheel in the cab to align the rear wheels in the straight-ahead position before changing from four-wheel steering (compound steering) to two-wheel (front-wheel) steering (simple steering). This is a difficult operation, particularly if the rear wheels are not visible from the driver's normal position in the cab.

The present invention relates to an arrangement such that, when switching means is operated to switch the steering control system from the first mode to the second mode, the change to the second mode is prevented unless and until the other steering mechanism (which does not operate in the second mode) is in its straight-ahead condition or state. In other words, after operating the switching means, the driver only has to turn his steering wheel (or other steering device) through the straight-ahead position in order to cause the change to the second mode to occur automatically, leaving the said other steering mechanism in the straight-ahead condition.

Such an arrangement is described in GB-A-2 208 282, which discloses a materials handling vehicle having two pairs of wheels movable to effect steering of the vehicle, at least one pair of wheels being lockable in a position so that steering is effected solely by the other pair of wheels, wherein sensor means are provided associated with each of the two pairs of wheels to provide an electrical signal to a control means when the respective wheels are in an aligned position in which their axes of rotation are perpendicular to a longitudinal axis of the vehicle, the control means including a selector means comprising electrical switch means to enable an operator to select simple steering mode in which only one of the pairs of wheels are movable to effect steering, or a compound steering mode in which both of the pairs of wheels are movable to effect steering, the control means further comprising means to maintain the selected steering mode until an alternative steering mode is selected by operation of the selector means and the control means receives a signal from at least one of the sensor means associated with one of the pairs of wheels. In that vehicle, each of the front and rear steering mechanisms has its own alignment sensor which is permanently activated so long as the vehicle is in operation.

The present invention provides a vehicle comprising a front steering mechanism and a rear steering mechanism, each steering mechanism having an operating range including a straight-ahead condition, a steering control system operatively connected to the front and rear steering mechanisms, the control system having a first mode in which both steering mechanisms operate and a second mode in which only one of the steering mechanisms operates, and first switching means for switching the control system from one mode to the other, the arrangement being such that, when the switching means is operated to switch from the first mode to the second mode, the change to the second mode is prevented unless and until the other steering mechanism is in its straight-ahead condition.

The vehicle includes alignment sensing means for sensing whether the other steering mechanism is in its straight-ahead condition, and second switching means switchable between a first state for preventing the change from the first mode to the second mode and a second state for permitting the said change, the alignment sensing means being operatively connected to the second switching means so that, when the first-mentioned switching means is operated to switch the control system from the first mode to the second mode, the second switching means is in the first state so long as the other steering mechanism is out of its straight-ahead condition and is in the second state when the other steering mechanism is in its straight-ahead condition.

The alignment sensing means is activated by the operation of the first switching means to switch the control system from the first mode to the second mode.

In other words, so long as the first switching means is in a state such that the control system must operate in the first mode, the alignment sensing means is not activated, and it remains inactive until the first switching means is switched to the other state.

The first mode may be switchable between standard steering in which the front and rear steering mechanisms turn in opposite directions (causing slewing of the vehicle) and crab steering in which they turn in the same direction (causing traversing of the vehicle).

The invention will be described further, by way of example, with reference to the accompanying drawings, in which.

Figure 1:
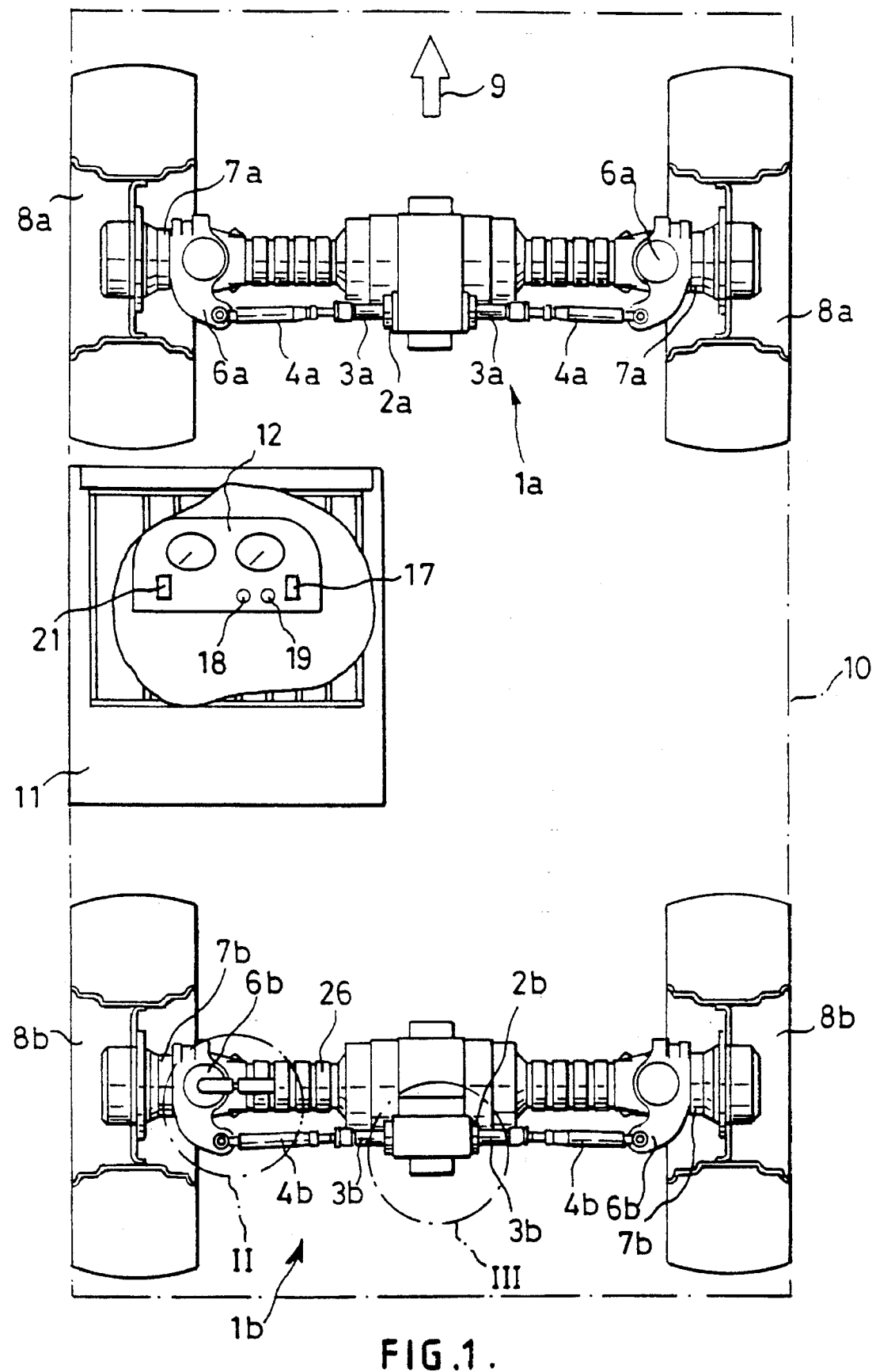
FIG. 1 is a diagrammatic part-cut-away plan view of a vehicle having a steering control system showing two embodiments of the present invention.

The vehicle 10 illustrated has front and rear steering mechanisms 1a,1b, each comprising a double-acting hydraulic ram 2a or 2b with piston rods 3a or 3b connected by respective links 4a or 4b to respective steering arms 6a or 6b which are rigid with respective stub axles 7a or 7b of respective wheels 8a or 8b and which are pivotable about substantially vertical steering axes. In FIG. 1 both steering mechanisms 1a and 1b are shown in the straight-ahead condition, from which they can turn through a limited range in both directions of turning, the arrow 9 indicating the direction of straight-ahead forward motion of the vehicle 10.

The front ram 2a is supplied with hydraulic fluid in accordance with the movement of a steering wheel (not shown) by the driver in a cab 11 containing a dashboard or control panel 12. Under the control of a control system 13 (FIG. 14), when operating in a first mode, hydraulic fluid is also supplied to the rear ram 26, in accordance with the movement of the steering wheel, via a selected one of two solenoid valves (not shown) operated by respective solenoids 14,16. If the solenoid 14 is energised, this results in standard four-wheel-steering, in which the front and rear steering mechanisms 1a, 1b turn in opposite senses. If the solenoid 16 is energised, this results in crab steering, in which the steering mechanisms 1a,1b turn in the same sense. The selection between four-wheel steer and crab steer is made by a switch 17 on the dashboard 12 and corresponding warning lights 18,19 on the dashboard are wired in parallel with the respective solenoids 14,16. The control system 13 operates in this first mode when a master switch 21 on the dashboard 12 is switched on, thereby connecting the control system to a 12 V supply via a fuse 20.

In a second mode of operation of the control system 13, neither of the solenoids 14,16 is energised, with the result that the rear steering mechanism 1b does not operate.

The control system 13 includes an alignment sensor 22 for detecting whether the rear steering mechanism 1b is in the straight-ahead state. When the master switch 21 is in the OFF position, the sensor 22 is connected to the 12 V supply; the sensor 22 then provides a 12 V output at X so long as the rear wheels 8b are not aligned with the centre-line of the vehicle 10. This output at X energises a relay 23 which holds closed a normally open switch 24 in series with the selector switch 17. The control system 13 is thus maintained in its first mode when the master switch 21 is moved to the OFF position, and remains in this state until the rear steering mechanism 1b arrives in the straight-ahead condition while the vehicle is being driven, whereupon the output at X ceases, thereby de-energising the relay 23, causing the switch 24 to open, thereby de-energising the solenoids 14,16 and thus removing hydraulic power from the rear steering mechanism 1b in the straight-ahead condition.

Figure 2:
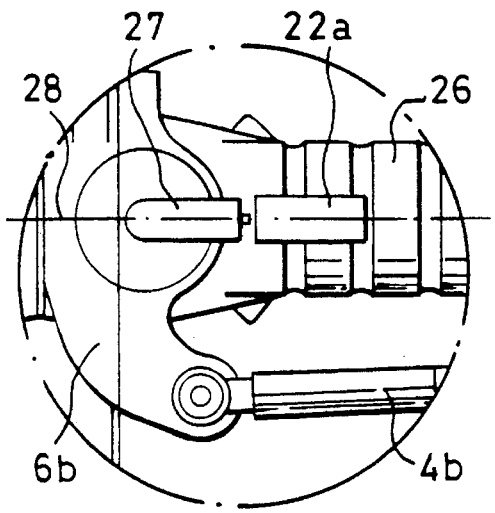
FIG. 2 is an enlarged detail II of FIG. 1, relating to a first embodiment.

FIGS. 1 and 2 show a first embodiment of the alignment sensor 22 comprising a capacitative or inductive proximity sensor 22a which is fixed on the rear axle 26 and which cooperates with a target element 27 fixed on the pivotable steering arm 6b associated with one of the rear wheels 8b. The sensor output is zero when the longitudinal axes of the sensor 22a and target element 27 are aligned on a common axis 28 (as shown in FIG. 2).

Figure 3:
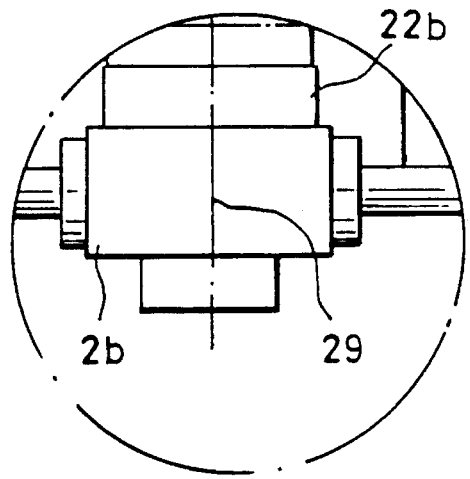
FIG. 3 is an enlarged detail III of FIG. 1, relating to a second embodiment.
Figure 4:
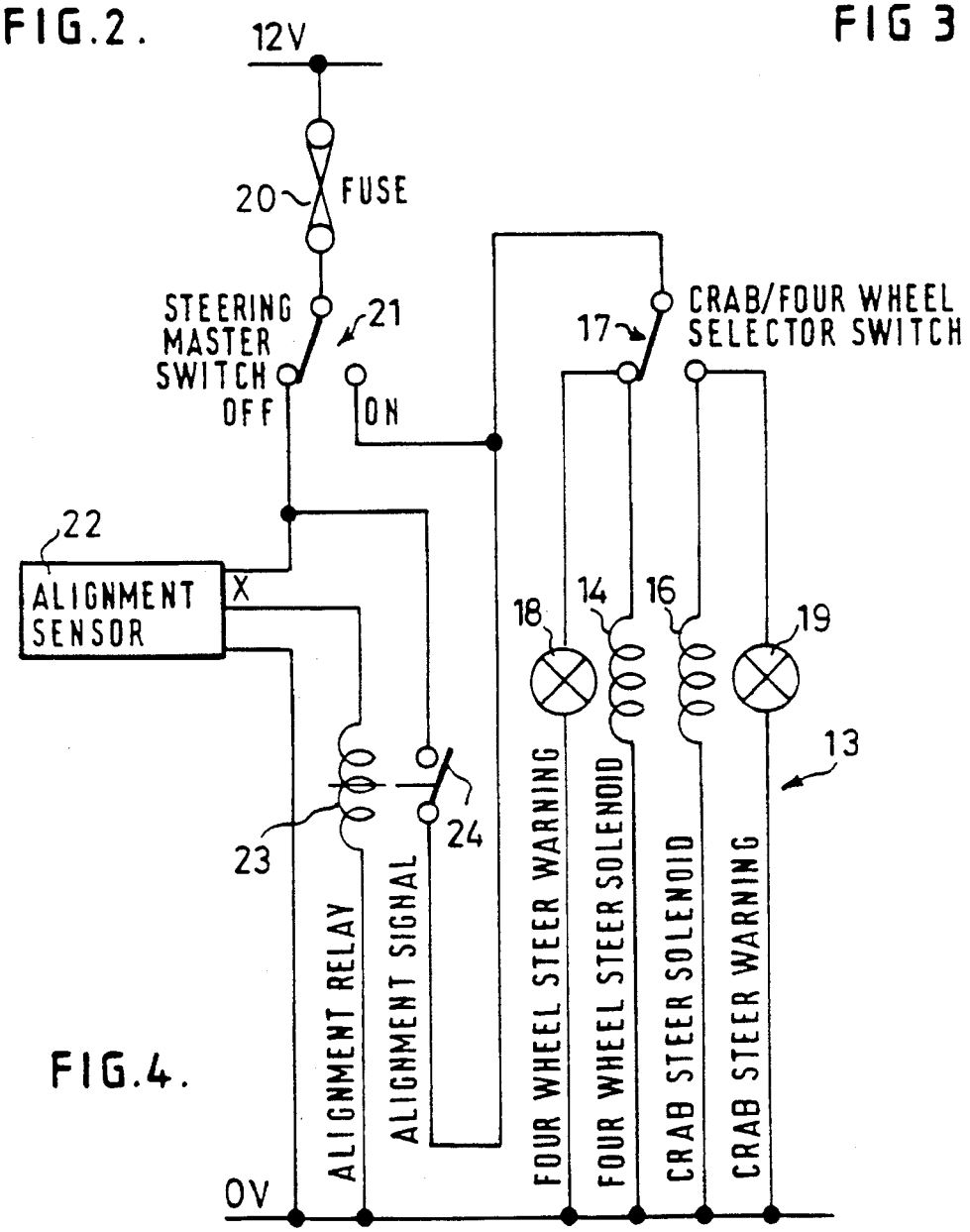
FIG. 4 is a circular diagram showing the steering control system as well as a master switch.

FIGS. 1 and 3 show a second embodiment of the alignment sensor 22 comprising a capacitative or inductive proximity sensor 22b which is fixed on the cylinder of the rear ram 2b and which cooperates with the piston of the ram 2b. The sensor output is zero when transverse median axes of the sensor 22b and piston are aligned on a common axis 29 (as shown in FIG. 3).

We claim:

1. A vehicle comprising:

a front steering mechanism (1a) and a rear steering mechanism (1b), each steering mechanism having an operating range including a straight-ahead condition;

a steering control system (13) operatively connected to the front and rear steering mechanisms (1a,1b), the control system (13) having a first mode in which both steering mechanisms operate and a second mode in which only one steering mechanism (1a) operates;

alignment sensing means (22) for sensing whether the other steering mechanism (1b) is in its straight-ahead condition;

first switching means (21) for switching the control system (13) from one mode to the other; and second switching means (24) switchable between a first state for preventing the change from the first mode to the second mode and a second state for permitting the change;

the alignment sensing means (22) being operatively connected to the second switching means (21) so that, when the first switching means (21) is operated to switch the control system (13) from the first mode to the second mode, the second switching means (24) is in the first state so long as the other steering mechanism (1b) is out of its straight-ahead condition and is in the second state when the other steering mechanism (1b) is in its straight-ahead condition;

characterised in that the alignment sensing means (22) is activated by the operation of the first switching means (21) to switch the control system (13) from the first mode to the second mode.

2. A vehicle as claimed in claim 1, in which the alignment sensing means (22) comprises a fixed sensor (22a;22b) mounted on the vehicle and sensing the relative position of a mobile element (27) whose movement is a function of the movement of the other steering mechanism (1b).

3. A vehicle as claimed in claim 2, in which the mobile element (27) is fixed on a pivotable steering arm (6b).

4. A vehicle as claimed in claim 2, in which the mobile element is constituted by a movable part of a hydraulic steering ram (2b).

5. A vehicle as claimed in claim 4, in which the movable part is a piston.

6. A vehicle as claimed in claim 1, in which the one steering mechanism (1a) is the front steering mechanism, and the other steering mechanism (1b) is the rear steering mechanism.

7. A vehicle as claimed in claim 1, including third switching means (17) for switching the operation of the control system (13), while in the first mode, between standard steering in which the front and rear steering mechanisms (1a,1b) turn in opposite directions and crab steering in which the front and rear steering mechanisms (1a,1b) turn in the same direction.

* * * * *